United States Patent Office 3,126,638
Patented Mar. 31, 1964

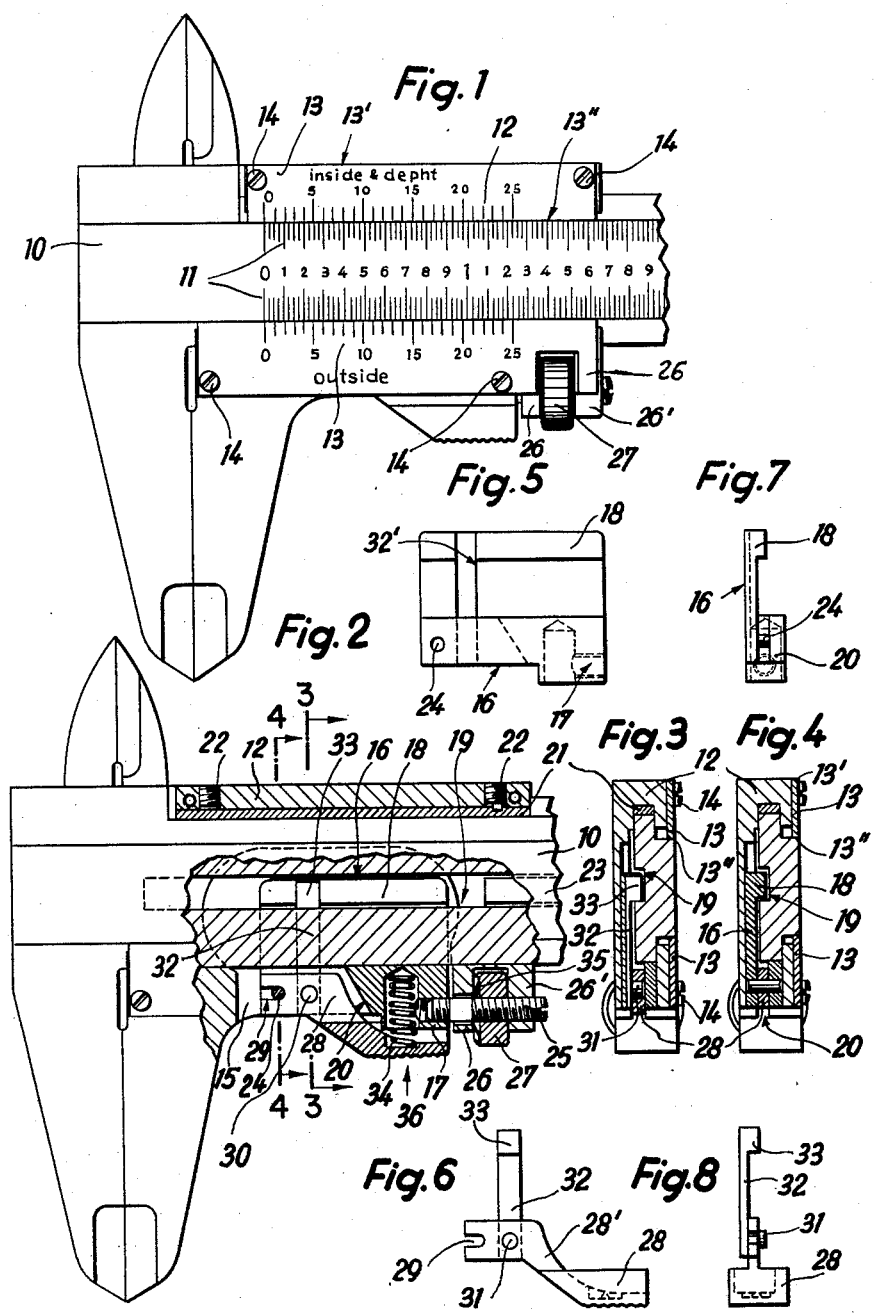

3,126,638
SLIDE CALIPER
Herbert Wickert, Konig-Wilhelmstrasse 21, and Edgar Kusch, Mauserstrasse 5, both of Oberndorf (Neckar), Germany
Filed Jan. 29, 1960, Ser. No. 5,554
Claims priority, application Germany Feb. 5, 1959
1 Claim. (Cl. 33—143)

In some slide calipers a measuring slide is shiftable on a fixed measuring bar and provided with arms embracing this bar on both sides. The measuring bar is provided with a measuring scale and the arms of the slide with vernier scales with the aid of which fractional parts of the graduations of the scale on the measuring bar can be measured. In addition, the measuring slide often carries a trailing slide which is clamped on the measuring bar after the measuring slide has been roughly set thereon, whereupon, with the aid of an adjusting screw on the fixed trailing slide, the measuring slide can be shifted the amount of the vernier fractional parts so that a final measurement can be precisely adjusted. As the vernier scales are on the embracing arms of the measuring slide which naturally have a certain thickness, the measuring scale on the measuring bar and the vernier scales on the measuring slide are at a certain distance apart. As a consequence, parallax errors result when reading. Even if the embracing arms of the measuring slide are bevelled in known manner towards the measuring scale on the measuring bar, the parallax errors, although reduced, are not entirely eliminated by the relative inclined position of the scales.

Moreover, if the vernier scales and possibly also the measuring scales are dull-finished or mat chrome plated, as is customary in the case of high-quality slide calipers, the dulling or chromium plating becomes worn and shiny after the calipers have been used considerably. This results in the parallax errors in the readings again becoming greater. For this reason alone it was hitherto necessary to maintain always a certain clearance between the sliding surfaces of the measuring slide and the surface of the measuring bar bearing the measuring scale. Consequently, absolute elimination of the parallax errors could never be attained.

Because, moreover, the conventional trailing slide for precision adjustment reduces the measuring range of the slide caliper by a length equal to the distance between the trailing slide and the measuring slide, it has already been proposed to arrange the fine adjustment slide within the measuring slide. For this purpose some of the fine adjustment slides had to be fixed on the measuring bar by means of a separate clamping screw, which naturally required separate manipulation. It is also the object of the invention to overcome this objection.

For this purpose a clamping lever is mounted on the fine adjustment slide within the measuring slide, on which lever a clamping jaw is pivoted which is slidable in a longitudinal groove in the measuring bar and, on the clamping lever being released, clamps the measuring slide on the measuring bar. The clamping lever is slidable at its front end in the fine adjustment slide with the aid of a slot and stud guide and is connected in such a manner that it is capable not only of carrying out a swinging movement but also of slight longitudinal displacement.

To enable the play of the measuring slide on the measuring bar to be taken up, a Phosphor bronze slide rail is slipped into the upper embracing arm of the measuring slide and fixed by a small grub screw.

An embodiment of the invention is illustrated by way of example in the accompanying drawing, in which FIG. 1 is a top plan view of the slide caliper with the rear portion broken away;

FIG. 2 is a longitudinal section through the rough and precision adjusting devices;

FIG. 3 is a cross-section taken on the plane 3—3 of FIG. 2;

FIG. 4 is a cross-section taken on the line 4—4 of FIG. 2;

FIG. 5 is a side elevation of the fine adjustment slide;

FIG. 6 is a side elevation of the clamping lever with clamping jaw pivoted thereon;

FIG. 7 is an elevation seen from the left of FIG. 5, and

FIG. 8 is an elevation seen from the left of FIG. 6.

The measuring bar of the slide caliper is designated by 10. It is of T-shaped cross-section. A measuring scale 11 is marked on the end face of the bar, that is on the end face of its shank. This scale is dull chrome plated or otherwise matted. A measuring slide 12 is guided on the ends of the cross-piece of the T-profile which the slide engages. The slide 12 has on each of its two forwardly directed arms a vernier plate 13 for each of the two measuring scales 11. Each vernier plate 13 is flush on its outer longitudinal side 13′ with the longitudinal side of the measuring slide 12, whereas on its inner longitudinal side 13″ it extends up to the shank of the measuring bar 10. Each of the vernier plates 13 is so thick that its graduated surface lies in the same plane as the surface of the measuring bar carrying the measuring scales 11. The vernier plates 13 are fixed on the slide 12 with screws 14 in such a manner that each plate can be set or adjusted.

As can be seen from FIG. 2, a longitudinal slot 15 is cut in the lower embracing arm of the measuring slide 12 and extends through to the measuring bar 10. A fine adjustment slide 16 is inserted into this slot 15 from the under side. This slide is of quadrilateral shape seen from the front (FIG. 5). It carries in its lower edge a blind bore 17 open at its rear end and extending parallel to the measuring bar 10 and provided with an internal screw thread. The adjustment screw spindle 25 engages in this bore and projects through two lugs 26, 26′ on the bottom of the measuring slide 12. An adjusting nut 27 is rotatable but not displaceable on the fine adjustment screw spindle 25 between the lugs 26, 26′. By turning this fine adjustment nut 27 the fine adjustment slide 16 can therefore be screwed to and fro on the fine adjustment screw spindle 25 within the vernier range.

The fine adjustment slide 16 carries on its upper edge a guide rail 18 which slides in a guide groove 19 cut in the rear surface of the measuring bar 10.

A longitudinal slot 20 is milled in the lower edge of the fine adjustment slide 16 from below and is open towards the front end of the slide 16. A rigid pin or stud 24 passes across the longitudinal slot 20 near the front end thereof. A clamping lever 28 is also fitted in the longitudinal slot 20 in the fine adjustment slide 16 from below and has in its forwardly directed end a slot 29 open towards the front and by means of which it is slipped on to the transverse pin or stud 24.

The clamping lever 28 also has in an arm 28′ projecting into the fine adjustment slide and guided in the longitudinal slot 20 of this slide, a hole 30 in which a transverse pin 31 is fitted and serves as pivot for a clamping jaw 33. This clamping jaw 33 is located within the contour of the guide rail 18 and its leg 32 slides in a longitudinal groove 32′ in the vertical rear wall of the fine adjustment slide 16.

If the clamping lever 28 is swung slightly in downward direction so that it turns about the rigid transverse pin 24 in the longitudinal slot 29, the pin 31 on the leg 32 then pulls the clamping jaw 33 downwards so that its underside is pressed against the bottom surface of the guide groove 19. As a result the fine adjustment slide 16 is firmly clamped against shifting.

The downward swinging of the clamping lever 28 is normally effected by a pressure spring 34 which bears at one end in the clamping lever 28 and at the other end is embedded in the material of the lower edge of the fine adjustment slide 16.

To prevent unintentional turning and to compensate for the play in the screw thread, the adjusting nut 27 is loaded by a cup spring 35.

The play of the measuring slide 12 on the measuring bar 10 is regulated by a slide rail 21 of Phosphor bronze which is held and pressed down by two grub screws 22. Finally the conventional depth scale on the measuring slide 12 is designated by 23.

The new slide caliper is manipulated in the following manner:

For rough setting the slide caliper, pressure is exerted in the direction of the arrow 36 by the thumb of the hand. The clamping lever 28 is thereby swung slightly upwards or inwards about the pin 24. This slight swing is sufficient to lift the clamping jaw 33 off the bottom surface of the longitudinal groove 19 through the intermediary of the hinge pin 31 and the clamping jaw leg 32 so far that the measuring slide 12 can be shifted on the measuring bar 10 until, for taking a rough measurement, the measuring jaws or measuring points bear against the object to be measured. When the pressure exerted by the thumb is removed, the spring 34 presses the clamping lever 28 again outwards. The clamping jaw 33 is thereby drawn against the bottom surface in the longitudinal groove 19 and fixes the measuring slide 12. For obtaining a fine adjustment or setting the vernier scale 13, the adjusting nut 27 is turned. This shifts the fine adjustment slide 18 according to the vernier scale on the clamping lever 28 which is now locked. The adjusting nut is also turned with the thumb so that the thumb need not be removed from the caliper. Hitherto, in the case of slide calipers with rough and precision adjustment, a separate clamping screw was necessary, and for tightening this screw, two fingers of the hand were required. This is dispensed with in the case of the new slide caliper.

We claim:

Slide calipers comprising a measuring slide provided with parallax-free vernier scales, a measuring bar cooperating with the measuring slide, a fine adjustment slide provided in a slot in the measuring slide, a screw spindle mounted on the fine adjustment slide and having an adjustment nut to adjust the slide upon the rotation of the nut, a clamping jaw mounted on a shaft, a clamping lever pivotally mounted on the fine adjustment slide connected to actuate the shaft and the clamping jaw and the latter normally contacting the measuring bar to release the latter for rough setting of the measuring slide, said fine adjustment slide having a vertical groove in a back wall of the fine adjustment slide, a guide rail on the top of the fine adjustment slide, and the clamping jaw being guided in the guide rail on top of the fine adjustment slide which slides in a longitudinal groove on the measuring bar.

References Cited in the file of this patent

UNITED STATES PATENTS

| | | |
|---|---|---|
| 301,945 | Winn | July 15, 1884 |
| 651,142 | Keuffel | June 5, 1900 |
| 1,514,532 | Kissendorfer | Nov. 4, 1924 |
| 2,369,425 | Becker | Feb. 13, 1945 |

FOREIGN PATENTS

| | | |
|---|---|---|
| 539,738 | France | Apr. 6, 1922 |
| 910,728 | France | Feb. 11, 1946 |
| 251,428 | Switzerland | Aug. 16, 1948 |
| 867,752 | Germany | Feb. 19, 1953 |
| 896,267 | Germany | Nov. 9, 1953 |